US006167978B1

United States Patent
Smietanski

(10) Patent No.: US 6,167,978 B1
(45) Date of Patent: Jan. 2, 2001

(54) INTEGRATION OF AN ENGINE LUBRICATION SYSTEM WITH AN ENGINE FUEL SYSTEM

(75) Inventor: Richard A. Smietanski, Lockport, IL (US)

(73) Assignee: Navistar International Transportation Corp, Chicago, IL (US)

( * ) Notice: Under 35 U.S.C. 154(b), the term of this patent shall be extended for 0 days.

(21) Appl. No.: 09/109,456

(22) Filed: Jul. 2, 1998

(51) Int. Cl.$^7$ ................................................ B60K 15/00
(52) U.S. Cl. ...................... 180/69.4; 123/196; 280/834; 237/264
(58) Field of Search ................. 123/196 R, 196 CP, 123/196 W; 137/246, 264, 255, 262, 351; 180/69.4; 280/834, 838

(56) References Cited

U.S. PATENT DOCUMENTS

| | | |
|---|---|---|
| 567,764 | 9/1896 | Dixon . |
| 1,332,945 | 3/1920 | Holderle et al. . |
| 2,421,765 | 6/1947 | Taylor . |
| 2,986,162 * | 5/1961 | Spexarth . |
| 3,101,771 | 8/1963 | McCuen . |
| 3,168,904 * | 2/1965 | Conover . |
| 3,633,609 * | 1/1972 | Robert .................................. 137/351 |
| 3,677,284 * | 7/1972 | Mendez ............................ 137/351 X |
| 3,874,471 * | 4/1975 | Kloefkorn ............................ 280/5 X |
| 3,931,907 * | 1/1976 | Henle ......................................... 280/5 |
| 4,178,004 * | 12/1979 | Shinoda et al. ....................... 137/264 |
| 4,370,998 | 2/1983 | Kimpara . |
| 4,787,643 * | 11/1988 | Shirata ................................ 280/5 A |
| 4,852,765 * | 8/1989 | Lyzohub ............................ 280/834 X |
| 4,911,330 * | 3/1990 | Vlanderen et al. ............... 280/838 X |
| 4,989,572 | 2/1991 | Giacomazzi et al. . |
| 5,022,494 | 6/1991 | Yamakage et al. . |
| 5,102,503 * | 4/1992 | Silinski et al. ................... 280/838 X |
| 5,330,070 | 7/1994 | Gerhard et al. . |
| 5,409,264 * | 4/1995 | Nakatani .............................. 280/834 |
| 5,429,267 | 7/1995 | San . |
| 5,509,381 * | 4/1996 | Fisher .................................. 123/196 |
| 5,538,077 | 7/1996 | So et al. . |
| 5,595,152 * | 1/1997 | Selby et al. .......................... 123/196 |
| 5,630,625 * | 5/1997 | Shaw ................................ 280/838 X |
| 5,673,939 * | 10/1997 | Bees et al. ........................ 280/834 X |
| 5,755,264 * | 5/1998 | Richards et al. ................. 280/838 X |
| 5,918,573 * | 7/1999 | Killion ................................. 123/196 |
| 5,921,758 * | 7/1999 | Anamoto et al. .................... 123/196 |
| 5,924,400 * | 7/1999 | Kobayashi ........................... 123/196 |
| 5,951,050 * | 9/1999 | Sickmann ......................... 137/264 X |
| 5,970,942 * | 10/1999 | Koebelein et al. .................. 123/196 |

* cited by examiner

*Primary Examiner*—Lanna Mai
*Assistant Examiner*—Toan To
(74) *Attorney, Agent, or Firm*—Dennis K. Sullivan; Jeffrey P. Calfa

(57) ABSTRACT

A powerplant includes an engine (22) that may be disposed on a vehicle chassis 12 including a cab (14) or may be a stationary engine such as a generator set, and has a fuel delivery system (54) through which combustible fuel is introduced into the engine for combustion to power the engine. A tank (42) is disposed on the chassis below the cab at one side of the chassis. A bulkhead (70) divides the tank into a fuel supply reservoir (50) for holding a supply of fuel for the engine and a second supply reservoir (52), the latter reservoir holding a supply of fluid other than engine fuel. A first supply conduit (56) supplies fuel from the fuel supply reservoir to the engine fuel delivery system, and a second supply conduit (66) supplies fluid from the second supply reservoir to a portion of the powertrain. A return conduit (68) returns fluid from the powertrain to the is second supply reservoir and includes a walled passage (72) passing through the fuel supply reservoir. An exchangeable filter (62) is disposed external to the tank and may be placed in filtering relation to flow of fluid through the return conduit. Heat exchanger structure may be associated with the walled passage within the fuel supply reservoir. A thermostat valve (104) may be disposed in the return conduit to selectively divert returning fluid through other heat exchanger structure before the fluid enters the second reservoir.

36 Claims, 5 Drawing Sheets

INTEGRATION OF AN ENGINE LUBRICATION SYSTEM WITH AN ENGINE FUEL SYSTEM

FIELD OF THE INVENTION

This invention relates to engine-powered vehicles that carry their own supplies of combustible fuel for their engines. The invention also relates to a new and useful association of a portion of a fluid system that handles a fluid other than engine fuel with a portion of an engine fuel system. Inventive principles are well-suited for various mobile and stationary uses. Mobile uses include land- and water-craft, while stationary uses include industrial engines that power various devices such as electric generators for example. Inventive principles are particularly advantageous in certain trucks, such as medium and heavy trucks.

BACKGROUND AND SUMMARY OF THE INVENTION

An internal combustion engine that powers an automotive vehicle comprises a lubrication system that lubricates relatively moving surfaces within the engine. A lubricant commonly used in such a system is known as engine motor oil, which may bear an SAE (Society of Automotive Engineers) grade designation indicating one or more physical characteristics, such as oil viscosity.

Certain internal combustion engines have self-contained lubrication systems that include deep-drawn oil pans disposed in underlying relation to their cylinder blocks to form engine crankcases. Such an oil pan provides a reservoir for motor oil that lubricates relatively moving internal engine surfaces requiring lubrication. A pump that is powered by the engine draws oil from the reservoir and forces it under pressure through a system of various internal oil passages to relatively moving surfaces requiring lubrication. Excess oil returns to the crankcase. It is in this way that the motor oil is circulated in a closed circuit to provide the required lubrication. The circuit typically includes a filter for removing contaminants, such as particulate materials, from the circulating oil, and may optionally include an oil cooler to enhance the rejection of heat from hot oil that has been heated as it passed through internal engine passages and across engine surfaces requiring lubrication. It is known to locate an oil cooler external to the engine where it can reject heat to air. It is also known to locate an oil cooler internal to a radiator header where it can reject heat to engine coolant being circulated through the radiator.

Because of various considerations, such as available engine compartment space and/or road and/or front axle clearance, the volume of oil that can be held in an oil pan may be limited. Engines that have smaller oil capacities may require more frequent oil changes than engines with larger ones. Visual inspection of oil fill level and certain servicing of the lubrication system may require opening of an engine compartment hood to obtain access to an oil fill and/or dip stick. Service procedures, such as draining old oil or changing a filter, may involve a person having to crawl under the vehicle either unaided or with the aid of a creeper, or the use of a ramp or hydraulic lift to elevate all on part of the vehicle off the ground.

A "dry sump" type lubrication system comprises an oil reservoir that is is external to a machine having relatively moving surfaces requiring lubrication. Oil is circulated in a closed circuit, being sucked by an oil pump from the reservoir through an oil supply conduit, then forced through tubes to the machine's various moving surfaces requiring lubrication, and finally returned to the reservoir through an oil return conduit. The circuit typically includes an oil filter.

If applied to certain automotive vehicles, a "dry sump" type lubrication system might provide certain advantages. It might allow a larger volume of oil in the lubrication system, and that consideration may provide certain benefits, a longer interval between oil changes being one example. Visual inspection of the amount of oil in the system may be more convenient. Servicing the system, including draining old oil, adding new oil, and changing the filter, may be easier and quicker.

Certain automotive vehicles, such as larger trucks for example, have fuel tanks that are chassis-mounted at a side of the vehicle below the driver's cab. Filling of such a tank can be made convenient by locating the fill of the tank to be accessible without the necessity of opening a fuel door to obtain access to a closure, or cap, that removably closes the fill.

It is believed that integrating an engine lubricating oil reservoir with a fuel tank in an engine-powered vehicle may provide certain benefits and/or economies in the manufacture and/or use of certain vehicle models.

Engine motor oil may also be used as a type of hydraulic actuating fluid that is used by hydraulic actuators. Certain electric-controlled high-pressure fuel injectors for internal combustion engines have hydraulic actuators that utilize hydraulic actuating fluid to inject fuel directly into engine combustion chambers. The present invention also has application to integration of a hydraulic actuating fluid reservoir with a fuel tank.

In one general respect, the present invention relates to an automotive vehicle engine oil supply system that has a novel, and advantageous, association with a portion of the vehicle's fuel system, particularly integration with a vehicle fuel tank. An internal wall partitions the interior of a tank into a fuel supply reservoir for holding a supply of fuel that is to be consumed by the engine and an oil supply reservoir for holding a supply of oil that can be used as engine lubricant and/or hydraulic actuating fluid. Fuel is supplied from the fuel supply reservoir to the engine through a fuel supply conduit. Oil is supplied from the oil supply reservoir to a portion of the vehicle powertrain through an oil supply conduit. Excess oil is returned to the oil reservoir through an oil return conduit. In returning to its reservoir, oil may flow through a filter that is external both to the tank and to the fuel supply reservoir. If the fuel system requires a return for excess fuel, the excess fuel is returned to the fuel supply reservoir through a fuel return conduit.

In vehicles like the larger trucks mentioned earlier, such an association can make checking the amount of oil in the system more convenient because the oil supply reservoir is disposed proximately adjacent the fuel supply reservoir. Service procedures like those previously mentioned can also be accomplished faster and more conveniently.

Accordingly, one generic aspect of the present invention relates to an automotive vehicle comprising: a chassis comprising a powertrain, including a driven member for supporting the chassis on an underlying surface and an engine that has a fuel delivery system for introducing combustible fuel into one or more combustion chambers of the engine for combustion to power the engine and cause the driven member to propel the vehicle on the underlying surface; a walled tank that bounds an interior volume; a partition partitioning the interior volume of the tank into a fuel supply reservoir that is bounded in part by one portion of the tank wall and a second reservoir that is bounded in part by another portion of the tank wall; a supply conduit through which fuel is supplied from the fuel supply reservoir to the engine fuel delivery system; and a circuit for circulating a fluid other than engine fuel from the second reservoir to a portion of the powertrain and back to the second reservoir.

A further generic aspect relates to an automotive vehicle comprising: a chassis having opposite sides extending between a front and a rear; a cab disposed on the chassis; a powertrain, including a driven member for supporting the chassis on an underlying surface and an engine that is disposed on the chassis and has a fuel delivery system through which combustible fuel is introduced into one or more combustion chambers of the engine for combustion to power the engine and cause the driven member to propel the vehicle on the underlying surface; a fuel supply reservoir and a second reservoir disposed on the chassis below the cab at one of the sides of the chassis; a first supply conduit through which fuel in the fuel supply is reservoir is supplied to the engine fuel delivery system; and a second supply conduit through which a fluid other than engine fuel is supplied from the second reservoir to a portion of the powertrain.

A further generic aspect relates to a land- or water-craft comprising: an engine that has a fuel delivery system for introducing combustible fuel into one or more combustion chambers of the engine for combustion to power the engine and propel the craft; a fuel supply reservoir disposed on the craft remote from the engine for holding a supply of fuel for the engine; a fuel supply conduit through which fuel in the fuel supply reservoir is supplied to the engine fuel delivery system; a second supply reservoir disposed on the craft remote from the engine for holding a supply of fluid other than fuel for the engine; and a circuit for circulating fluid from the second supply reservoir to a portion of the craft and back to the second supply reservoir, the circuit including a walled passage passing through the fuel supply reservoir.

A further generic aspect relates to a land- or water-craft comprising: an engine that has a fuel delivery system for introducing combustible fuel into one or more combustion chambers of the engine for combustion to power the engine and propel the craft; a walled tank that includes a partition partitioning the interior of the tank into a first interior volume and a second interior volume, the first interior volume being bounded in part by one portion of the tank wall and the second interior volume being bounded in part by another portion of the tank wall; a fuel supply conduit through which fuel is supplied from one of the interior volumes to the engine fuel delivery system; and a fluid supply and return circuit through which fluid other than engine fuel is supplied from the other of the interior volumes to the engine and returned to the other -interior volume.

A further generic aspect relates to tank structure for holding two diverse fluids comprising: a walled tank that includes a partition partitioning the interior of the tank into a first interior volume for one fluid and a second interior volume for another fluid, the first interior volume being bounded in part by one portion of the tank wall and the second interior volume being bounded in part by another portion of the tank wall; the partition comprising a bulkhead and a walled passage extending from the bulkhead; the bulkhead being disposed to the place the first interior volume in adjacent relation to one portion of the second interior volume, and the walled passage being disposed to place the first interior volume in circumferentially surrounding relation to another portion of the second interior volume.

A further generic aspect relates to a land- or water-craft comprising: a powertrain, including an engine that has a fuel delivery system for introducing combustible fuel into one or more combustion chambers of the engine for combustion to power the engine and propel the craft; a fuel supply reservoir for holding a supply of liquid fuel for the engine; a second reservoir for holding a supply of fluid other than engine fuel; a conduit through which fuel is supplied from the fuel supply reservoir to the engine fuel delivery system; and a circuit for circulating a fluid other than fuel for the engine from the second reservoir to a portion of the powertrain and back to the second reservoir, the circuit including a return through which fluid that has been supplied from the second reservoir to the powertrain is returned to the second reservoir, the return including a walled passage passing through the fuel supply reservoir, and a valve disposed in the return to selectively divert returning fluid through a branch passage that is open to the second reservoir but does not pass through the fuel supply reservoir.

Within one or more of the foregoing generic aspects, some of the more specific aspects include: the partition comprising a bulkhead; the second reservoir comprising an oil supply reservoir for holding a supply of oil that is circulated through the circuit to relatively moving surfaces of the engine requiring lubrication and back to the oil supply reservoir; the circuit including a return through which oil that has been supplied to the engine from the oil supply reservoir is returned from the engine, the return including a walled passage passing through the fuel supply reservoir; the walled passage preferably including heat exchanger structure disposed externally thereon within the fuel supply reservoir, or comprising a tube that follows a torturous path through the fuel supply reservoir or other known type of heat exchanger. The powertrain may also comprise at least one hydraulic actuator that utilizes hydraulic actuating fluid, and the second reservoir may comprise a hydraulic actuating fluid supply reservoir for holding a supply of hydraulic actuating fluid that is circulated through the circuit from the hydraulic actuating fluid supply reservoir to the hydraulic actuator and back to the hydraulic actuating fluid supply reservoir. Additionally, the engine may have hydraulically actuated fuel injectors for injecting fuel into respective combustion chambers of the engine, which utilize hydraulic actuating fluid, preferably lubricating oil, from the oil supply reservoir; the circuit including a pressurizing pump that is disposed on the engine to provide hydraulic pressure for the fuel injectors. Further, the return for the oil or hydraulic actuating fluid may include a valve to selectively divert returning fluid through a branch passage that is open to the second reservoir, but does not pass through the fuel supply reservoir but rather through a second heat exchanger structure located at the forward portion of the vehicle; the valve comprising a temperature responsive actuator that, over a lower temperature range, is effective to cause the valve to allow fluid flow through the walled passage passing through the fuel reservoir and to disallow fluid flow through the branch passage, and over an upper temperature range, is effective to cause the valve to disallow fluid flow through the walled passage passing through the fuel reservoir and to allow fluid flow through the branch passage. Additionally, the chassis may comprise a frame side rail, with the fuel supply reservoir and the second reservoir being disposed adjacent along, and outboard of, the frame side rail such that one reservoir is toward the front of the chassis and the other is toward the rear of the chassis; an exchangeable filter disposed in filtering relation to oil or hydraulic actuating fluid returning to the second reservoir and external to both reservoirs such that the second reservoir is disposed between the fuel supply reservoir and the filter; and the engine having a bottom that is closed by an oil collection pan having a collection volume that is smaller than the volume of the second supply reservoir.

A still further generic aspect of the invention relates to a powerplant comprising: an engine that has a fuel delivery system for introducing combustible fuel into one or more combustion chambers of the engine for combustion to power the engine; a fuel supply reservoir disposed remote from the engine for holding a supply of fuel for the engine; a fuel supply conduit through which fuel in the fuel supply reservoir is supplied to the engine fuel delivery system; a second supply reservoir disposed remote from the engine for holding a supply of fluid other than fuel for the engine; and a circuit for circulating fluid from the second supply reservoir to a portion of the engine and back to the second supply reservoir, the circuit including a walled passage passing through the fuel supply reservoir.

The foregoing, along with further aspects, features, and advantages of the invention, will be seen in this disclosure of a presently preferred embodiment of the invention depicting the best mode contemplated at this time for carrying out the invention. This specification includes drawings, now briefly described, followed by detailed description that will refer to these drawings.

DESCRIPTION OF THE PREFERRED EMBODIMENT

Figure 1:
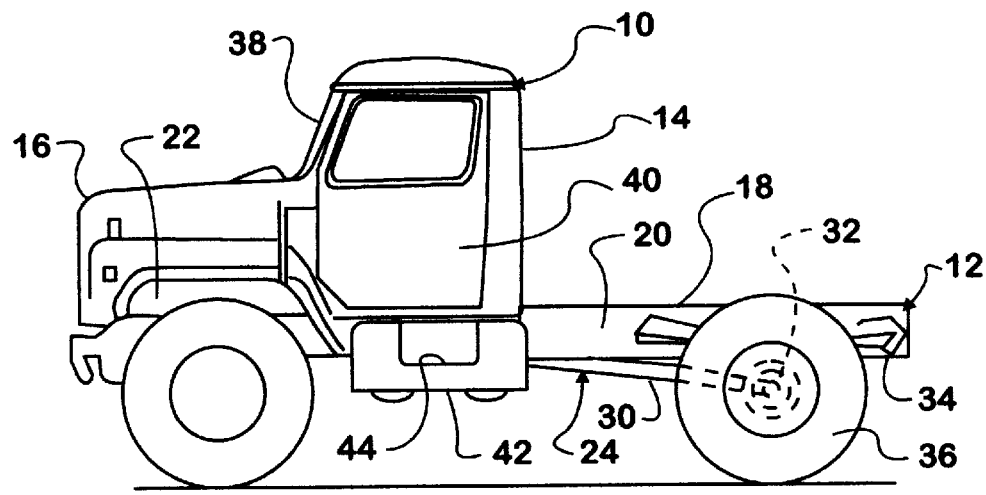
FIG. 1 is a side elevation view of an automotive vehicle embodying principles of the present invention.

FIG. 1 shows an automotive vehicle 10 as a truck having a chassis 12, a cab 14, and an engine compartment hood 16. Chassis 12 comprises a frame 18 having respective side rails 20 that extend lengthwise along respective sides of the truck between front and rear of chassis 12. An engine 22 is mounted on frame 18 at the front of the truck between side rails and is covered by hood 16.

Figure 2:
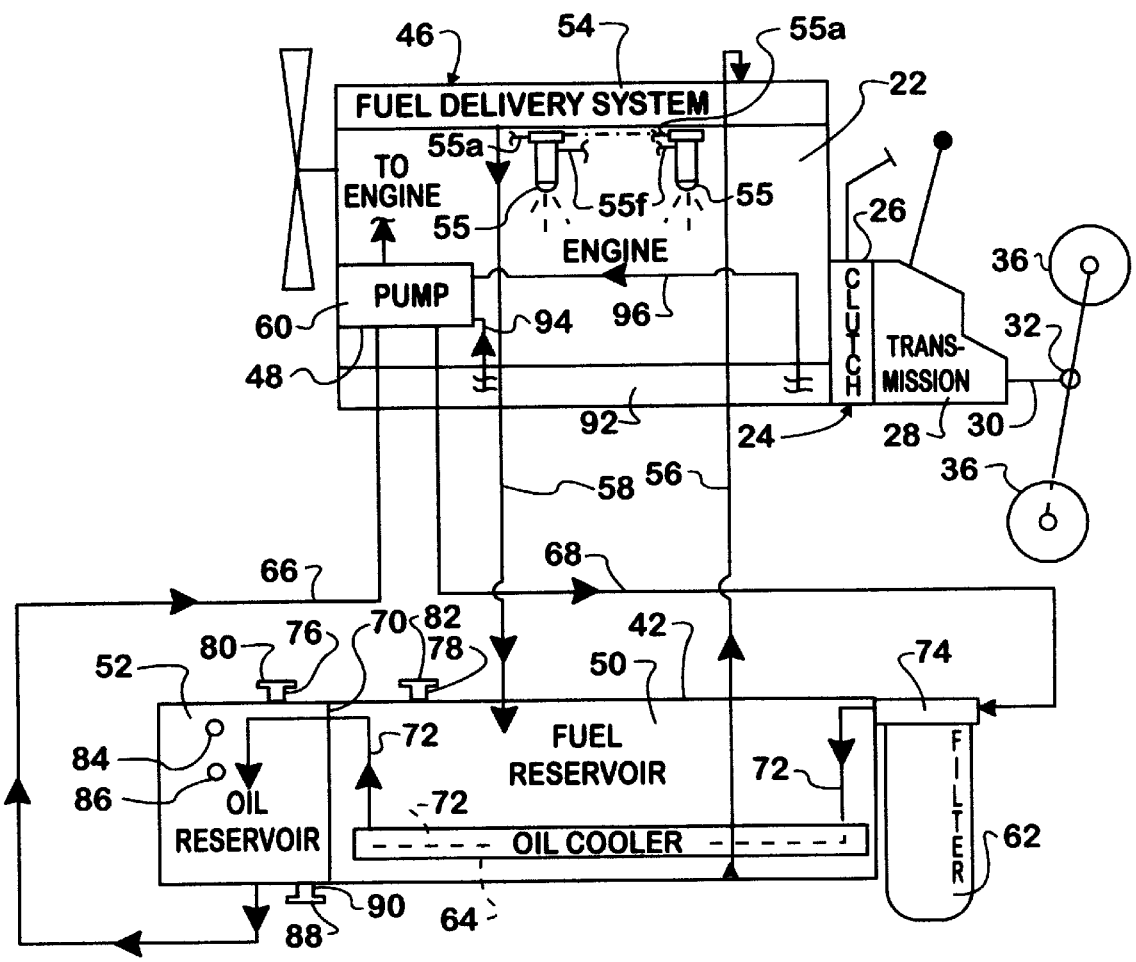
FIG. 2 is a general schematic diagram of a powertrain of the automotive vehicle of FIG. 1, including certain detail of engine oil and fuel systems embodying principles of the present invention.

Engine 22 is the prime mover of a powertrain 24 that is shown in more detail in FIG. 2 to include a clutch 26, a manual transmission 28, a driveshaft 30, and a rear axle assembly 32 that is suspended from frame 18 proximate the rear of the truck by a suspension system 34. Wheels 36 that include pneumatic tires are attached to the ends of axle assembly 32. When engine 22 is running, clutch 26 is engaged, and transmission 28 is in a drive gear, power is transmitted through powertrain 24 to wheels 36. With wheels 36 supporting the truck on an underlying surface, the flow of power through powertrain 24 causes wheels 36 to propel vehicle 10 on the underlying surface.

Cab 14 is mounted on frame 18 rearward of engine 22. A rear perimeter of hood 16 seals against a mating perimeter of a dash of cab 14 that is below a windshield 38 of the cab. Cab 14 has a side door 40 providing a driver of the vehicle ingress to and egress from the cab interior. Mounted on a side rail 20 on the left side of the vehicle below door 40 and outboard of frame 18 is a tank 42 whose length is disposed parallel to the length of the side rail. Tank 42 may have any suitable shape in transverse cross section, such as a circular shape, a square shape, or a rectangular shape. It may also, as illustrated, include a step 44 that facilitates driver ingress to and egress from cab 14 through door 40.

FIG. 2 shows a first fluid system 46 and a second fluid system 48 that handle respective, diverse fluids, such as engine lubricating oil or hydraulic fluid, for utilization by either the powertrain 24 or other vehicle-mounted equipment. Engine 22 may be any suitable fuel-consuming powerplant, such as a diesel engine, of an appropriate configuration for powering the GVW (gross vehicle weight) of the truck. Fluid system 46 may therefore be a fuel system 46 that handles diesel fuel for engine 22.

A diesel engine may be fuel-injected, comprising a cylinder block that contains cylinders into which fuel is injected. Certain fuel systems for diesel engines comprise high-pressure fuel injectors that utilize engine motor oil as a hydraulic actuating fluid, to attain the requisite fuel injection pressures. Fluid system 48 may therefore be an oil, or other hydraulic actuating fluid, system for such fuel injectors. If engine motor oil is used as the fuel injector actuating fluid, that same fluid may be used to provide lubrication for relatively moving surfaces of powertrain 24, including relatively moving internal surfaces of engine 22. U.S. Pat. No. 5,597,118, which is incorporated by reference herein, shows a fuel system employing high-pressure fuel injectors that utilize high-pressure hydraulic actuating fluid, which may be engine motor oil, for the direct injection of fuel into engine cylinders.

In accordance with certain principles of the invention, tank 42 comprises both a fuel reservoir 50 for liquid fuel handled by fuel system 46 and a reservoir 52 for fluid other than engine fuel handled by system 48.

Fuel system 46 further includes a fuel delivery system 54, a high-pressure fuel injection system for example, that delivers fuel at proper times into the engine cylinders where it is combusted to power the engine. Fuel is either pumped or sucked, by a fuel pump (not shown), from fuel reservoir 50 through a fuel supply conduit 56 to fuel delivery system 54. If the fuel delivery system is of the type that requires return of excess fuel from engine 22 to fuel reservoir 50, such excess fuel is returned through a fuel return conduit 58. Fuel injectors 55 of the type described in U.S. Pat. No. 5,597,118 are schematically portrayed in FIG. 2 as an example of fuel injectors that are electrically controlled and that contain hydraulic actuators for injecting fuel into engine 22 for combustion. Each fuel injector 55 has a fuel port 55f to which fuel is supplied and a hydraulic actuator port 55a to which hydraulic actuating fluid is supplied.

Where system 48 uses engine motor oil as the fluid, reservoir 52 is an oil reservoir 52. System 48 may also include an engine-driven oil pump 60 and a filter 62. The illustrated embodiment further includes heat exchanger structure, such as an oil cooler, 64 disposed within fuel reservoir 50. Oil reservoir 52 holds a supply of oil for use by engine 22. Pump 60, filter 62, and oil cooler 64 are connected in a circuit that extends from oil reservoir 52 to engine 22 and from engine 22 back to reservoir 52. The circuit includes an oil supply conduit 66 through which oil from reservoir 52 is conveyed to pump 60, and an oil return conduit 68 through which oil is returned from engine 22. It should be observed that in returning to oil reservoir 52, the circuit passes through the interior of that portion of tank 42 that comprises fuel reservoir 50.

A desirable construction for providing reservoirs 50 and 52 within the interior of tank 42 is by an imperforate-walled partition comprising a bulkhead 70 disposed within the tank generally transverse to the tank length. The bulkhead perimeter is joined to the cross section of the tank in any suitable fashion that ensures that the respective fluids in the respective reservoirs are always segregated from each other. By providing oil reservoir 52 at one lengthwise end of tank 42, filter 62 may be conveniently disposed externally at the opposite lengthwise end and connected with reservoir 52 by a conduit segment 72 forming a walled passage that enters reservoir 50, passes completely through reservoir 50, and finally exits reservoir 50 through bulkhead 70 to open into reservoir 52. Where it enters and exits reservoir 50, conduit segment 72 is suitably sealed to respective openings in the tank wall and the bulkhead respectively so that fuel does not leak from reservoir 50 at the locations where the conduit segment penetrates the reservoir. As it passes through reservoir 50, conduit segment 72 is circumferentially surrounded by interior space of reservoir 50. Although principles of the invention are applicable to the use of various materials in fabricating tank 42, bulkhead 70, and conduit segment 72, these parts may be any conventional fuel-resistant material used in the fabrication of vehicle fuel tanks. Additionally, although the tank 42 is illustrated as a generally horizontal with a vertical bulkhead, the tank could be vertical or the bulkhead horizontal in a suitable application.

The end of conduit segment 72 that is open to filter 62 is shown connected to a port of a flange 74 on which filter 62 is exchangeably mounted. In this way filter 62 can be conveniently replaced when appropriate. Flange 74 includes another port to which an end of return conduit 68 is connected. Flange 74 is disposed on the exterior of tank 42 and is constructed to place filter 62 in filtering relation to flow passing from one flange port to the other. Because filter 62 is not within the engine compartment, more free space may be proximately available to allow filter size to be increased without interference with nearby parts. The portion of the circuit that returns oil to reservoir 52 from engine 22 therefore comprises return conduit 68, filter 62 and conduit segment 72.

The construction also provides convenience in servicing both reservoirs. In the illustrated embodiment, there is no oil fill or dip stick under hood 16, and so the hood does not have to be opened when reservoir 52 is serviced. Each reservoir 50, 52 may be provided with a respective fill 76, 78 at, or proximate, its top. Each fill is shown closed by a respective removable closure 80, 82. It is believed that in certain vehicle models, long filler tubes extending from the reservoirs are unnecessary. The level of oil in reservoir 52 may be visually ascertained by two sight glasses 84, 86 that are disposed at different vertical elevations on the side of the tank. The upper sight glass 84 may be used when filling the reservoir to ascertain when the amount of oil has reached its level. The lower sight glass 86 may be used to indicate the need for refilling when the amount of oil drops below its level. Oil may be drained from reservoir 52 by removing a drain plug 88 from a drain opening 90 at the bottom of the tank. Because there is no longer any sump on the oil pan, it may be possible to lower the engine in the vehicle and reduce hood height.

While certain general principles of the invention are not dependent on any particular pump 60, the invention advantageously allows for pump 60 to be an external, rather than an internal, pump. Like an internal one, an external pump can still be engine-mounted and engine-driven, but an external pump may offer improved packaging for engine 22 within the under-hood engine compartment of certain vehicle models.

Elimination of the usual under-engine crankcase, or oil pan, that serves as the oil reservoir may be especially advantageous. Rather than having a deep-draw oil pan forming the bottom of the engine, a much shallower one 92 may be used. This can increase road and/or front axle clearance beneath the engine, and/or allow for the engine's center of gravity in the vehicle and/or the hood to be lowered. The volume of oil that can be contained in reservoir 52 is greater than that which can be held in shallow pan 92.

Oil that collects in shallow pan 92 can be scavenged for return to reservoir 52 by utilizing a multistage pump for pump 60. Such a pump may have a pressurizing stage for sucking oil from reservoir 52 through conduit 66 and forcing it under pressure into a portion of the powertrain that utilizes oil. Where the fluid handled by system 48 is oil, it may be utilized to lubricate relatively moving internal surfaces within engine 22, in which case the pressurized oil is introduced into a system of internal lubricant passageways in engine 22, i.e., internal engine oil passages.

The pump may have one or more scavenging stages, the illustrated pump having two. One scavenging stage sucks collected oil from the front of shallow pan 92 through a conduit 94 while the other sucks collected oil from the rear of the pan through a conduit 96. The scavenged oil is pumped back to reservoir 52 through conduit 68, filter 62, and conduit segment 72.

Because the fluid circuit of system 48 passes through the interior of fuel reservoir 50, heat exchange may take place between the returning oil and liquid fuel in reservoir 50. Relatively hotter returning oil can reject heat to relatively cooler liquid fuel. The heat rejection efficiency can be increased in one or more of several ways, including: placement of a majority of conduit segment 72 near the bottom of reservoir 50 where it will be immersed in liquid fuel when reservoir 50 is filled to a predetermined fill level; making the material of conduit segment 72 more thermally conductive; increasing the length of conduit segment 72 that is immersed in liquid fuel; and associating heat transfer structure with conduit segment 72.

Figure 3:
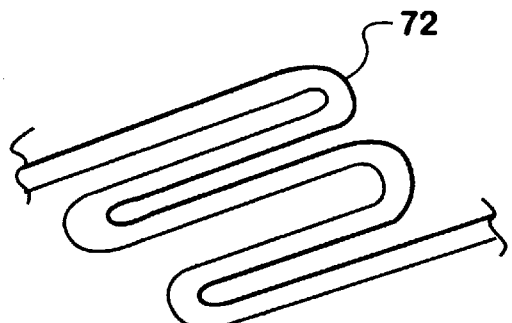
FIG. 3 is a fragmentary perspective view of one embodiment of an element of an oil system by itself.
Figure 4:
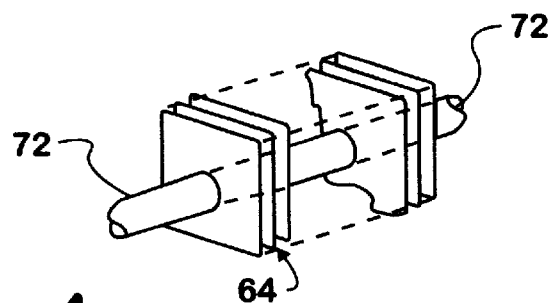
FIG. 4 is a fragmentary perspective view of another embodiment of the element by itself.

FIG. 3 shows conduit segment 72 provided with increased length by being bent back and forth in a torturous path through fuel reservoir 50. FIG. 4 shown a stack of fins 98 mounted on the exterior of conduit segment 72 to form a fin-type heat exchanger corresponding to oil cooler 64. Other forms of heat exchanger may be employed as appropriate. The transfer of heat to fuel from returning non-fuel fluid, such as oil that has been used to lubricate internal engine surfaces and/or operate hydraulic actuators, can be beneficial in cold weather operation, especially if the fuel is diesel fuel, to assure that the fuel will flow properly, replacing or augmenting the diesel fuel heater commonly employed for such function.

Principles of the invention may yield certain manufacturing and/or design advantages. The suggested interval between oil changes may be increased by increasing the volume of reservoir 52. Because of its integrated construction, tank 42 may be tested before it is assembled to a chassis. Assembly plant costs may be reduced because of fewer connections and attachments. Reducing the number of connections may reduce the likelihood of leakage. Vehicle designers may have greater freedom in the design of vehicle packaging and/or be able to use available space more efficiently.

Figure 5:
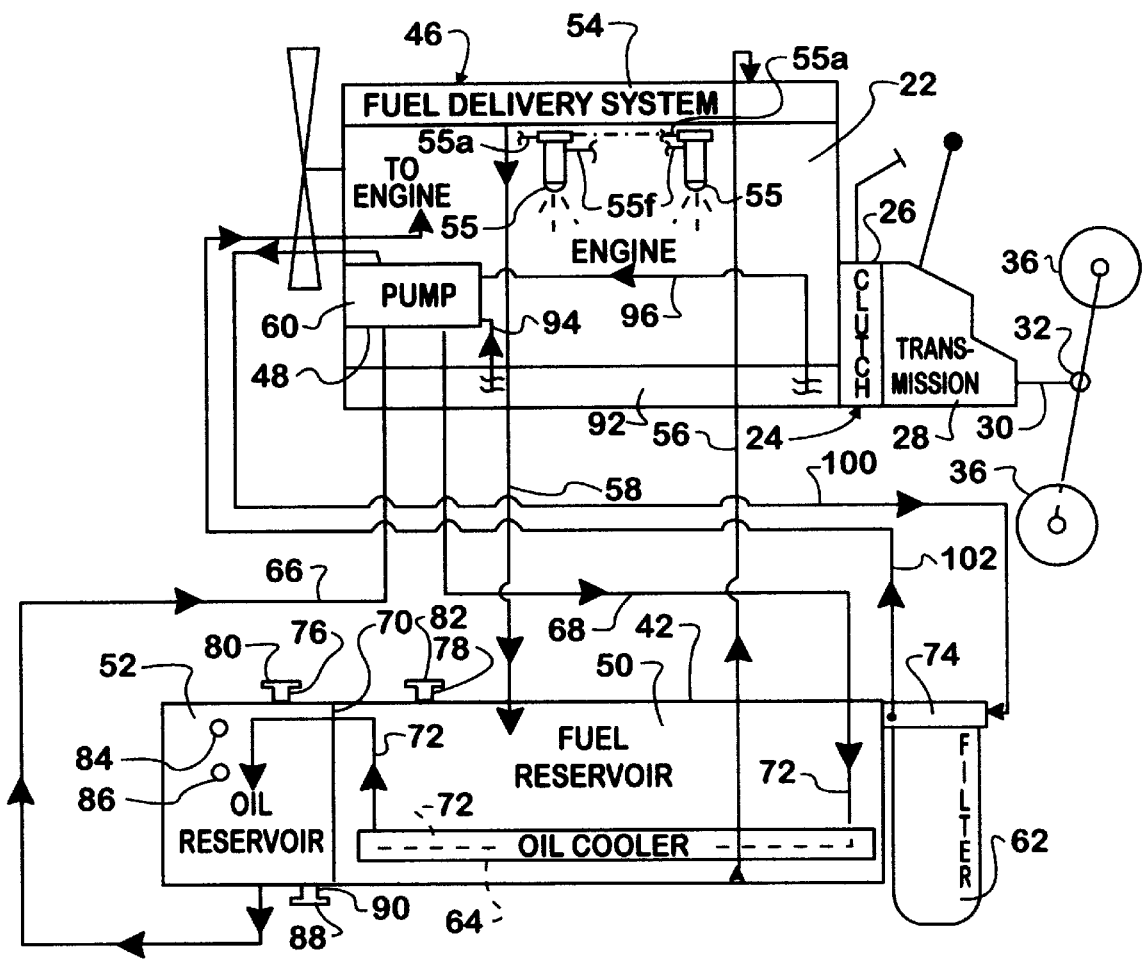
FIG. 5 is a view similar to FIG. 2 showing one modified form.

FIG. 5 shows a modified form in which components corresponding to those previously described in FIG. 2 are identified by like reference numerals. In FIG. 5, fuel system 46 is like its counterpart in FIG. 2; system 48 differs however in that oil return conduit 68 by-passes filter 62 to return oil directly to conduit segment 72 without filtering. While filter 62 may still be exchangeably mounted on the exterior of tank 42, it now filters oil that has been pumped by pump 60. Hence a conduit 100 connects the pressurizing stage outlet port of pump 60 to the port of flange 74 to which conduit 68 had been connected in FIG. 2. The port of flange 74 to which conduit segment 72 had been connected in FIG. 2 is connected by a conduit 102 back to engine 22 for use in supplying filtered oil for lubricating relatively moving internal engine surfaces and/or for operating hydraulic actuators, such as those of fuel injectors 55 or other vehicle mounted equipment.

Figure 6:
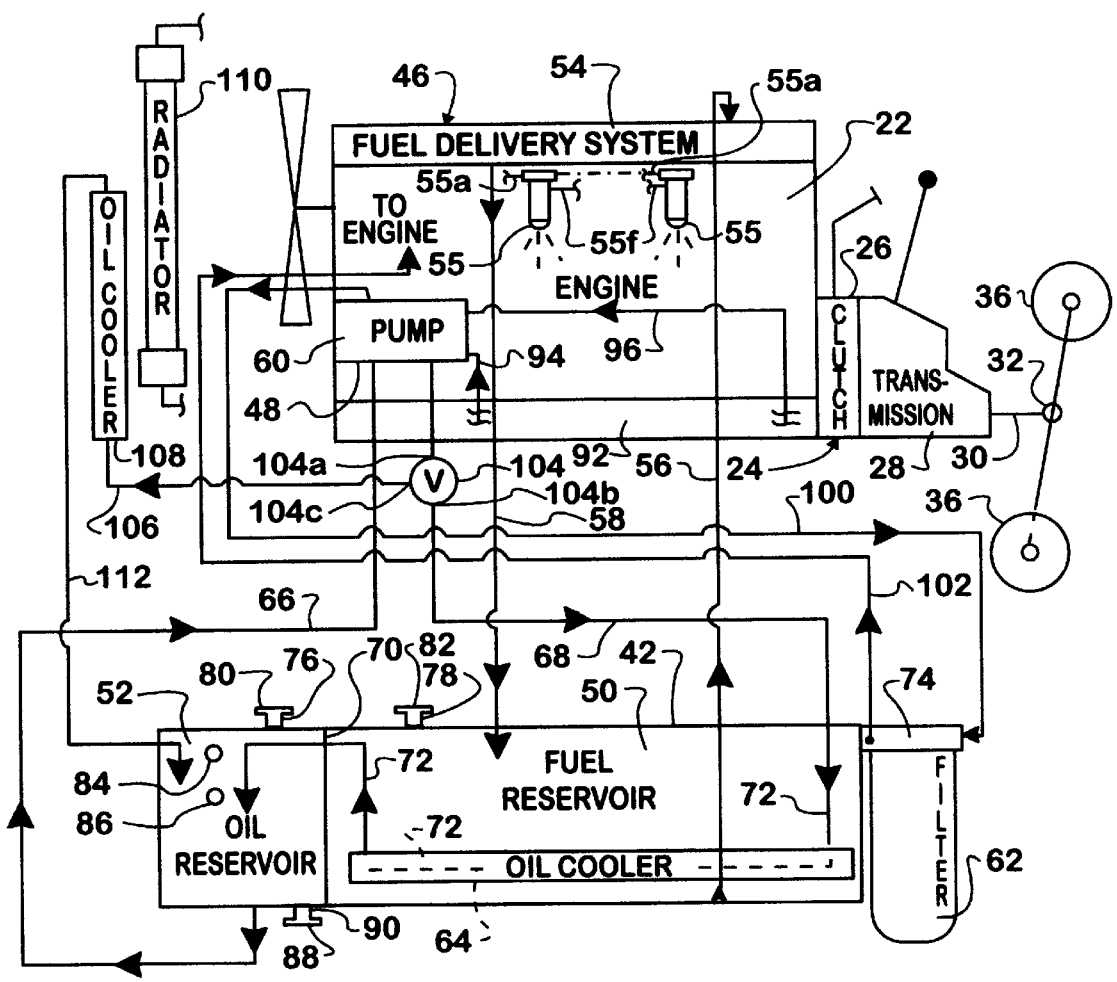
FIG. 6 is a view similar to FIG. 2 showing another modified form.

FIG. 6 shows another modified form in which components corresponding to those previously described in FIG. 5 are identified by like reference numerals. In FIG. 6, fuel system 46 is like its counterpart in FIG. 5; system 48 is like its counterpart in FIG. 5, except for a modification in the circuit that returns oil from pump 60 to reservoir 52. A thermostat valve 104 is placed in the conduit between pump 60 and conduit segment 72 by communicating an inlet port 104a to the pump scavenging stage outlet port and by communicating a first outlet port 104b to the entrance of conduit segment 72. Thermostat valve 104 has a second outlet port 104c that is communicated by a conduit 106 to the entrance of an oil cooler 108 that is disposed in front of a radiator 110 of a liquid cooling system of engine 22. A return conduit 112 communicates an exit of oil cooler 108 to reservoir 52.

Thermostat valve 104 is temperature sensitive. Preferably, the thermostat valve is sensitive to ambient air temperature. Over a lower temperature range, it is open between ports 104a and 104b, while being closed to port 104c. Over an upper temperature range it is open between ports 104a and 104c, while being closed to port 104b. Hence during cold weather operation, returning engine oil is routed to pass through fuel reservoir 50 where it can heat the fuel therein. During hot weather operation, returning oil is instead routed to oil cooler 108 where heat is rejected to air rather than adding thermal energy to fuel in reservoir 50. General principles of the invention contemplate that various forms of thermostat valve 104 and various control strategies for operating such valves may be employed to accomplish the selective diversion of fluid in system 48 to a heat exchanger other than the one contained within reservoir 50. Although not specifically shown in a separate drawing, a form of the invention may comprise the inclusion of a thermostat valve 104 and oil cooler 108 in a system 48 like that of FIG. 2.

Figure 7:
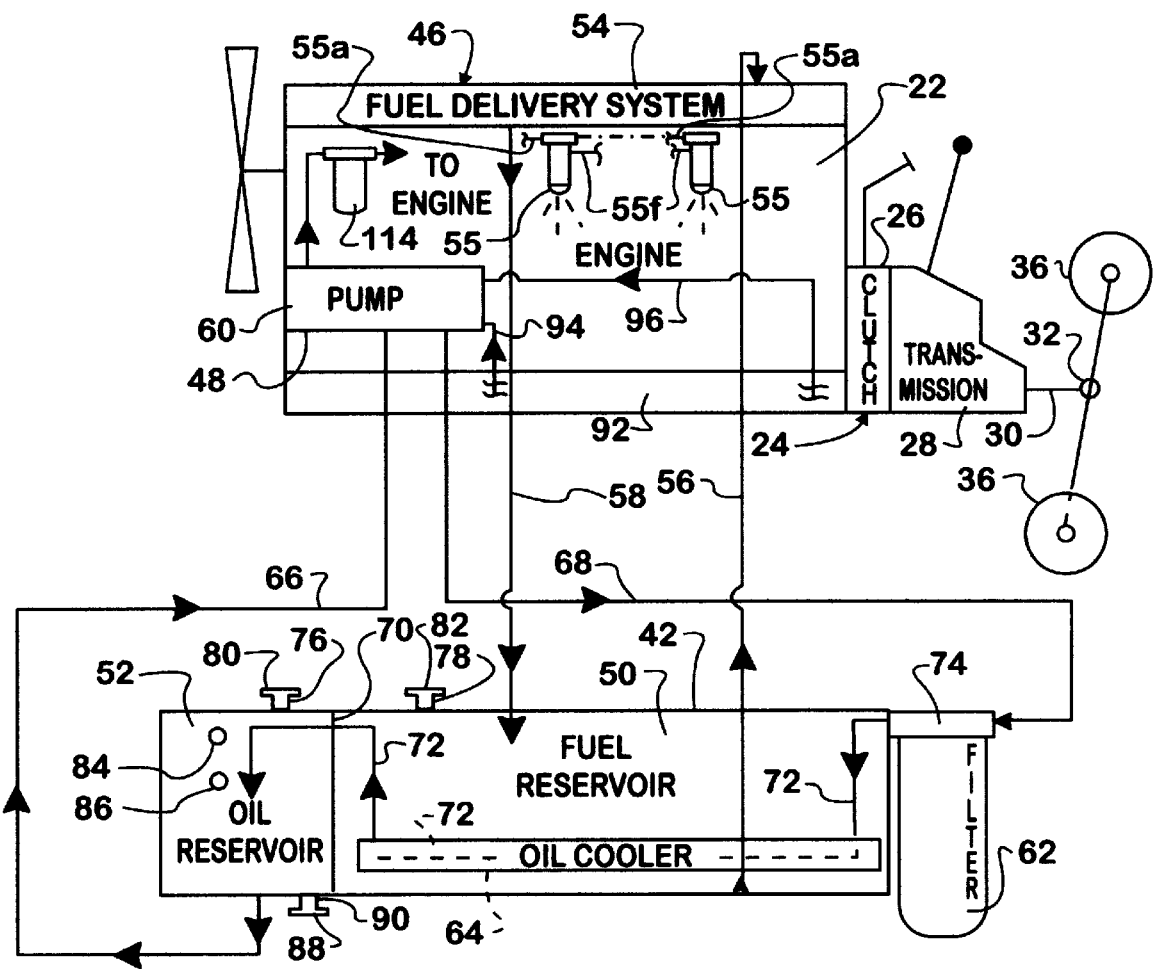
FIG. 7 is a view similar to FIG. 2 showing still another modified form.

FIG. 7 shows another modified form in which components corresponding to those previously described in FIG. 2 are identified by like reference numerals. In FIG. 7, fuel system 46 is like its counterpart in FIG. 2; system 48 is also like its counterpart in FIG. 2, except for the inclusion of a second exchangeable filter 114, which may be engine-mounted, connected to the outlet port of the pressurizing stage of pump 60. Filter 114 serves to filter oil pumped by pump 60 before that oil is utilized in powertrain 24. Although not specifically shown in a separate Figure, a form of the invention may comprise the inclusion of a thermostat valve 104 and oil cooler 108 in a system 48 like that of FIG. 7.

While a presently preferred embodiment of the invention has been illustrated and described, it should be appreciated that principles of the invention are applicable to all embodiments and uses that fall within the scope of the following claims.

What is claimed is:

1. An automotive vehicle comprising:

a chassis comprising a powertrain, including a driven member for supporting the chassis on an underlying surface and an engine that has a fuel delivery system for introducing combustible fuel into one or more combustion chambers of the engine for combustion to power the engine and cause the driven member to propel the vehicle on the underlying surface;

a walled tank that bounds an interior volume;

a partition partitioning the interior volume of the tank into a fuel supply reservoir that is bounded in part by one portion of the tank wall and a second reservoir that is bounded in part by another portion of the tank wall;

a supply conduit through which fuel is supplied from the fuel supply reservoir to the engine fuel delivery system; and a circuit for circulating a fluid other than engine fuel from the second reservoir to a portion of the powertrain and back to the second reservoir, the circuit comprising heat exchanger structure disposed within the fuel supply reservoir in heat exchange relationship with fuel in the fuel supply reservoir.

2. An automotive vehicle as set forth in claim 1 in which the partition comprises a bulkhead.

3. An automotive vehicle as set forth in claim 1 in which the engine comprises relatively moving surfaces requiring lubrication, and the second reservoir comprises an engine motor oil supply reservoir for holding a supply of engine motor oil that is circulated through the circuit from the engine motor oil supply reservoir to the relatively moving engine surfaces and back to the engine motor oil supply reservoir.

4. An automotive vehicle as set forth in claim 3 in which the circuit includes a return through which engine motor oil that has been supplied from the engine motor oil supply reservoir to the relatively moving engine surfaces is returned to the engine motor oil supply reservoir, the return including a walled passage passing through the fuel supply reservoir.

5. An automotive vehicle comprising:

a chassis comprising a powertrain, including a driven member for supporting the chassis on an underlying surface and an engine that has a fuel delivery system for introducing combustible fuel into one or more combustion chambers of the engine for combustion to power the engine and cause the driven member to propel the vehicle on the underlying surface;

a walled tank that bounds an interior volume;

a partition partitioning the interior volume of the tank into a fuel supply reservoir that is bounded in part by one portion of the tank wall and a second reservoir that is bounded in part by another portion of the tank wall;

a supply conduit through which fuel is supplied from the fuel supply reservoir to the engine fuel delivery system; and a circuit for circulating a fluid other than engine fuel from the second reservoir to a portion of the powertrain and back to the second reservoir;

in which the engine comprises relatively moving surfaces requiring lubrication, and the second reservoir comprises an engine motor oil supply reservoir for holding a supply of engine motor oil that is circulated through the circuit from the engine motor oil supply reservoir to the relatively moving engine surfaces and back to the engine motor oil supply reservoir;

in which the circuit includes a return through which engine motor oil that has been supplied from the engine motor oil supply reservoir to the relatively moving engine surfaces is returned to the engine motor oil supply reservoir, the return including a walled passage passing through the fuel supply reservoir and further including heat exchanger structure disposed externally on the walled passage within the fuel supply reservoir.

6. An automotive vehicle as set forth in claim 4 in which the walled passage comprises a tube that follows a tortuous path through the fuel supply reservoir.

7. An automotive vehicle as set forth in claim 1 in which the powertrain comprises at least one hydraulic actuator that utilizes hydraulic actuating fluid, and the second reservoir comprises a hydraulic actuating fluid supply reservoir for holding a supply of hydraulic actuating fluid that is circulated through the circuit from the hydraulic actuating fluid supply reservoir to the at least one hydraulic actuator and back to the hydraulic actuating fluid supply reservoir.

8. An automotive vehicle as set forth in claim 7 in which the fuel delivery system comprises fuel injectors for injecting fuel into respective combustion chambers of the engine, and the at least one hydraulic actuator comprises, for each fuel injector, a respective hydraulic actuator that utilizes hydraulic actuating fluid from the hydraulic actuating fluid supply reservoir to inject fuel into the respective combustion chamber.

9. An automotive vehicle as set forth in claim 8 in which the circuit includes a pressurizing pump that is disposed on the engine to pressurize the hydraulic actuating fluid for the hydraulic actuators.

10. An automotive vehicle as set forth in claim 7 in which the engine comprises relatively moving surfaces requiring lubrication, and the circuit also supplies hydraulic actuating fluid from the hydraulic actuating fluid supply reservoir to the relatively moving engine surfaces and back to the hydraulic actuating fluid supply reservoir, thereby lubricating the relatively moving surfaces with hydraulic actuating fluid.

11. An automotive vehicle as set forth in claim 1 in which the circuit includes a return through which fluid that has been supplied from the second reservoir to the powertrain is returned to the second reservoir, the return includes a walled passage passing through the fuel supply reservoir, and a valve is disposed in the return to selectively divert returning fluid through a branch passage that is open to the second reservoir but does not pass through the fuel supply reservoir.

12. An automotive vehicle as set forth in claim 11 in which the branch passage comprises heat exchanger structure for extracting heat from fluid passing through the branch passage before the fluid returns to the second reservoir.

13. An automotive vehicle as set forth in claim 11 in which the valve comprises a temperature responsive actuator that, over a lower temperature range, is effective to cause the valve to allow fluid flow through the walled passage through the fuel reservoir and to disallow flow through the branch passage, and over an upper temperature range, is effective to cause the valve to disallow fluid flow through the walled passage through the fuel reservoir and to allow flow through the branch passage.

14. An automotive vehicle comprising:
a chassis having opposite sides extending between a front and a rear;
a cab disposed on the chassis;
a powertrain, including a driven member for supporting the chassis on an underlying surface and an engine that is disposed on the chassis and has a fuel delivery system through which combustible fuel is introduced into one or more combustion chambers of the engine for combustion to power the engine and cause the driven member to propel the vehicle on the underlying surface;
a fuel supply reservoir and a second reservoir disposed on the chassis below the cab at one of the sides of the chassis;
a first supply conduit through which fuel in the fuel supply reservoir is supplied to the engine fuel delivery system;
a second supply conduit through which a fluid other than fuel for the engine is supplied from the second reservoir to a portion of the powertrain; and
a return through which fluid that has been supplied to the powertrain from the second reservoir through the second supply conduit is returned from the powertrain to the second reservoir;
the return comprising heat exchanger structure disposed within the second reservoir in heat exchange relationship with fuel in the fuel supply reservoir.

15. An automotive vehicle as set forth in claim 14 in which the fuel supply reservoir and the second reservoir are provided within the interior of a walled tank that includes a partition partitioning the interior of the tank into the fuel supply reservoir and the second reservoir, the fuel supply reservoir being bounded in part by one portion of the tank wall and the second reservoir being bounded in part by another portion of the tank wall.

16. An automotive vehicle as set forth in claim 15 in which the partition comprises a bulkhead.

17. An automotive vehicle as set forth in claim 14 including a return through which fluid that has been supplied to the powertrain from the second reservoir through the second supply conduit is returned from the powertrain to the second reservoir, the return including a walled passage passing through the fuel supply reservoir.

18. An automotive vehicle as set forth in claim 17 in which the walled passage is arranged within the fuel supply reservoir such that when liquid fuel fills the fuel supply reservoir to at least a certain level, a majority of the walled passage within the fuel supply reservoir is immersed in liquid fuel.

19. An automotive vehicle comprising:
a chassis having opposite sides extending between a front and a rear;
a cab disposed on the chassis;
a powertrain, including a driven member for supporting the chassis on an underlying surface and an engine that is disposed on the chassis and has a fuel delivery system through which combustible fuel is introduced into one or more combustion chambers of the engine for combustion to power the engine and cause the driven member to propel the vehicle on the underlying surface;
a fuel supply reservoir and a second reservoir disposed on the chassis below the cab at one of the sides of the chassis;

a first supply conduit through which fuel in the fuel supply reservoir is supplied to the engine fuel delivery system;

a second supply conduit through which a fluid other than fuel for the engine is supplied from the second reservoir to a portion of the powertrain; including a return through which fluid that has been supplied to the powertrain from the second reservoir through the second supply conduit is returned from the powertrain to the second reservoir, the return including a walled passage passing through the fuel supply reservoir;

in which the walled passage is arranged within the fuel supply reservoir such that when liquid fuel fills the fuel supply reservoir to at least a certain level, a majority of the walled passage within the fuel supply reservoir is immersed in liquid fuel; and further including heat exchanger structure disposed externally on the walled passage within the fuel supply reservoir.

20. An automotive vehicle as set forth in claim 17 in which the walled passage comprises a tube that follows a tortuous path through the fuel supply reservoir.

21. An automotive vehicle as set forth in claim 14 in which the chassis comprises a frame side rail, and the fuel supply reservoir and the second reservoir are disposed adjacent along, and outboard of, the frame side rail such that one reservoir is toward the front of the chassis and the other is toward the rear of the chassis.

22. An automotive vehicle as set forth in claim 21 in which the fuel supply reservoir and the second reservoir are provided within the interior of a walled tank that includes a partition dividing the interior of the tank into the fuel supply reservoir and the second reservoir, the fuel supply reservoir being bounded in part by one portion of the tank wall and the second reservoir being bounded in part by another portion of the tank wall.

23. An automotive vehicle as set forth in claim 14 including a return conduit through which fluid that has been supplied to the powertrain from the second reservoir through the second supply conduit is returned from the powertrain to the second reservoir, the return conduit including a walled passage passing through the fuel supply reservoir, and further including an exchangeable filter disposed in filtering relation to fluid returning through the return conduit.

24. An automotive vehicle as set forth in claim 23 in which the exchangeable filter is disposed external to the second reservoir such that the second reservoir is disposed between the fuel supply reservoir and the filter.

25. An automotive vehicle as set forth in claim 14 including a return through which fluid that has been supplied from the second reservoir to the powertrain is returned to the second reservoir, the return including a walled passage passing through the fuel supply reservoir, and including a valve that is disposed in the return to selectively divert returning fluid through a branch passage that is open to the second reservoir but does not pass through the fuel supply reservoir.

26. An automotive vehicle as set forth in claim 25 in which the branch passage comprises heat exchanger structure for extracting heat from fluid passing through the branch passage before the fluid returns to the second reservoir.

27. An automotive vehicle as set forth in claim 25 in which the valve comprises a temperature responsive actuator that, over a lower temperature range, is effective to cause the valve to allow fluid flow through the walled passage through the fuel reservoir and to disallow flow through the branch passage, and over an upper temperature range, is effective to cause the valve to disallow fluid flow through the walled passage through the fuel reservoir and to allow flow through the branch passage.

28. A craft comprising:

an engine that has a fuel delivery system for introducing combustible fuel into one or more combustion chambers of the engine for combustion to power the engine and propel the craft;

a walled tank that includes a partition partitioning the interior of the tank into a first interior volume and a second interior volume, the first interior volume being bounded in part by one portion of the tank wall and the second interior volume being bounded in part by another portion of the tank wall;

a fuel supply conduit through which fuel is supplied from one of the interior volumes to the engine fuel delivery system; and a fluid supply and return circuit through which fluid other than fuel for the engine is supplied from the other of the interior volumes to the engine and returned to the other interior volume;

the fluid supply and return circuit further including heat exchanger structure disposed within the one interior volume in heat exchange relationship with fuel in the one interior volume.

29. A craft as set forth in claim 28 in which the partition comprises a bulkhead and a walled passage extending from the bulkhead.

30. A craft as set forth in claim 29 in which the bulkhead is disposed to place the one interior volume and one portion of the other interior volume in mutually adjacent relation, and the walled passage is disposed to place the one interior volume in circumferentially surrounding relation to another portion of the other interior volume.

31. A craft as set forth in claim 28 including a pump that is disposed external to, but that is driven by, the engine for pumping fluid through the circuit.

32. A craft as set forth in claim 28 in which the engine has a bottom that is closed by a collection pan having a collection volume that is smaller than the volume of the one portion of the other interior volume.

33. A tank structure for holding two diverse fluids comprising:

a walled tank that includes a partition partitioning the interior of the tank into a first interior volume for fuel and a second interior volume for another fluid, the first interior volume being bounded in part by one portion of the tank wall and the second interior volume being bounded in part by another portion of the tank wall;

the partition comprising a bulkhead and a walled passage extending from the bulkhead;

the bulkhead being disposed to place the first interior volume in side-by-side relation to the second interior volume, and the walled passage being circumferentially surrounded by the first interior volume, the walled passage comprising heat exchanger structure disposed on the walled passage exterior within the first interior volume in heat exchange relationship with fuel in the first interior volume.

34. A tank structure as set forth in claim 33 including an exchangeable filter disposed external to the tank and in filtering relation to flow through the walled passage.

35. A powerplant comprising:

an engine that has a fuel delivery system for introducing combustible fuel into one or more combustion chambers of the engine for combustion to power the engine;

a fuel supply reservoir disposed remote from the engine for holding a supply of fuel for the engine;

a fuel supply conduit through which fuel in the fuel supply reservoir is supplied to the engine fuel delivery system;

a second supply reservoir disposed remote from the engine for holding a supply of fluid other than fuel for the engine; and a circuit for circulating fluid from the second supply reservoir to a portion of the engine and back to the second supply reservoir, the circuit including a walled passage passing through the fuel supply reservoir, and heat exchanger structure disposed on the walled passage in heat exchange relationship with fuel in the fuel supply reservoir.

36. A powerplant as set forth in claim 35 in which the fuel supply reservoir and the second supply reservoir are contained with a walled tank that includes a partition partitioning the interior of the tank into a first interior volume corresponding to the fuel supply reservoir and a second interior volume corresponding to the second supply reservoir, the first interior volume being bounded in part by one portion of the tank wall and the second interior volume being bounded in part by another portion of the tank wall.

* * * * *